US011125186B2

(12) United States Patent
Gallet

(10) Patent No.: US 11,125,186 B2
(45) Date of Patent: Sep. 21, 2021

(54) AIRCRAFT COMPRISING TWO CONTRA-ROTATING FANS TO THE REAR OF THE FUSELAGE, WITH SPACING OF THE BLADES OF THE DOWNSTREAM FAN

(71) Applicant: SAFRAN AIRCRAFT ENGINES, Paris (FR)

(72) Inventor: Francois Gallet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 191 days.

(21) Appl. No.: 15/745,944

(22) PCT Filed: Jul. 21, 2016

(86) PCT No.: PCT/FR2016/051888
§ 371 (c)(1),
(2) Date: Jan. 18, 2018

(87) PCT Pub. No.: WO2017/013366
PCT Pub. Date: Jan. 26, 2017

(65) Prior Publication Data
US 2018/0209380 A1    Jul. 26, 2018

(30) Foreign Application Priority Data

Jul. 22, 2015 (FR) ...................................... 1556955

(51) Int. Cl.
*F02K 3/072* (2006.01)
*B64D 27/14* (2006.01)
(Continued)

(52) U.S. Cl.
CPC .............. *F02K 3/072* (2013.01); *B64D 27/14* (2013.01); *F01D 7/00* (2013.01); *F02C 3/073* (2013.01);
(Continued)

(58) Field of Classification Search
CPC . F02K 1/64; F02K 3/065; F02K 3/072; F02C 3/10; F02C 7/32; F01D 9/04
See application file for complete search history.

(56) References Cited

U.S. PATENT DOCUMENTS 3,946,554 A * 3/1976 Neumann .................. F02C 9/20
60/204
4,657,484 A * 4/1987 Wakeman ............. B64C 11/306
415/130

(Continued)

FOREIGN PATENT DOCUMENTS

FR    2997681        5/2014
GB    2185719    *   1/1986
(Continued)

OTHER PUBLICATIONS

International Search Report and Written Opinion with English Language Translation, dated Nov. 28, 2016, Application No. PCT/FR2016/051888.

*Primary Examiner* — Todd E Manahan
*Assistant Examiner* — Thuyhang N Nguyen
(74) *Attorney, Agent, or Firm* — Womble Bond Dickinson (US) LLP

(57) ABSTRACT

The invention relates to an aircraft comprising a fuselage (1), which is propelled by a turbine engine with two coaxial fans, namely an upstream fan (7) and a downstream fan (8), driven by two contra-rotating rotors (5, 6) of a power turbine (3). The two fans (7, 8) and the turbine (3) are integrated into a nacelle (14) which projects downstream from the fuselage (1) and through which air flows. According to the invention, at least one of the fans (7, 8) of the aircraft and, in particular, the downstream fan (8) comprises variable-spacing blades, and at least one stator-forming variable-spacing blade ring (25) in the aircraft is placed upstream of the upstream fan (7). The variable-spacing stator blades (25) and the variable- (Continued)

spacing blades of the downstream fan (8) are mutually configured to direct the air flow in a first mode in which the air flows through the nacelle (14) from upstream to downstream and in a second mode in which the air is pushed back upstream through the nacelle (14).

24 Claims, 3 Drawing Sheets

(51) Int. Cl.

| | | |
|---|---|---|
| *F02K 1/66* | (2006.01) | |
| *F02K 1/72* | (2006.01) | |
| *F01D 7/00* | (2006.01) | |
| *F02K 1/52* | (2006.01) | |
| *F02C 3/073* | (2006.01) | |
| *F02K 3/062* | (2006.01) | |
| *F02K 3/065* | (2006.01) | |

(52) U.S. Cl.
CPC ................ *F02K 1/52* (2013.01); *F02K 1/66* (2013.01); *F02K 1/72* (2013.01); *F02K 3/062* (2013.01); *F02K 3/065* (2013.01); *F05D 2220/323* (2013.01); *F05D 2240/35* (2013.01); *F05D 2250/311* (2013.01); *F05D 2260/74* (2013.01); *Y02T 50/60* (2013.01)

(56) References Cited

U.S. PATENT DOCUMENTS

| | | | |
|---|---|---|---|
| 4,767,270 A | 8/1988 | Seidel | |
| 4,791,783 A * | 12/1988 | Neitzel | ................ F01D 17/162 |
| | | | 60/226.3 |
| 8,336,290 B2 * | 12/2012 | Glynn | ................... B64C 11/38 |
| | | | 60/268 |
| 9,849,970 B2 * | 12/2017 | Escure | ................ B64C 11/385 |
| 2015/0291285 A1 * | 10/2015 | Gallet | .................... F01D 13/02 |
| | | | 415/60 |

FOREIGN PATENT DOCUMENTS

| | | | | |
|---|---|---|---|---|
| GB | 2185719 | | 7/1987 | |
| GB | 2185719 A * | | 7/1987 | ............. F02K 1/66 |
| WO | WO-2013050704 A1 * | | 4/2013 | |
| WO | WO2014023891 | | 2/2014 | |
| WO | WO 2014072615 A1 * | | 5/2014 | ............ F01D 13/02 |
| WO | WO-2014072615 A1 * | | 5/2014 | |

* cited by examiner

AIRCRAFT COMPRISING TWO CONTRA-ROTATING FANS TO THE REAR OF THE FUSELAGE, WITH SPACING OF THE BLADES OF THE DOWNSTREAM FAN

FIELD OF THE INVENTION AND PRIOR ART

The present invention relates to the field of aircraft such as aeroplanes, particularly civil aeroplanes, propelled by a turbine engine with contra-rotating fans, the turbine engine being integrated in the extension of the fuselage downstream of said fuselage. More specifically, it relates to the means for adapting the fans in this type of architecture to the various operating conditions of the aircraft.

Patent application FR-A1-2997681 proposes a new aircraft architecture that allows noise pollution and aircraft fuel consumption to be reduced while limiting aerodynamic drag through absorption of the boundary layer.

In such an architecture, an aircraft is propelled by a turbine engine with ducted contra-rotating fans, the turbine engine being integrated in the rear of the fuselage of the aircraft. In general, the turbine engine comprises two gas generators that supply a power turbine with two contra-rotating rotors for driving two fans disposed downstream of the gas generators. The gas generators have distinct lateral air intakes for the supply of each of them. Downstream of the gas generators, the fans are disposed in the extension of the fuselage of the aircraft and are generally supplied via an annular ring connected to the aircraft, so as to absorb at least part of the boundary layer formed around the fuselage. The diameter of the fans is approximately that of the largest section of the fuselage. The rotation speed of the fans is generally lower only for conventional turbine engines, particularly so that the speed at the vane head can be subsonic.

The two fans form an assembly with a low compression ratio and a high flow rate. In this case, it is difficult to adapt the operating point of the downstream fan as a function of the engine speeds and in certain flight conditions it is possible to encounter low operability margins for this fan.

Furthermore, the aircraft needs to be equipped with a reverse thrust system for the turbine engine such as, for example, that which is disclosed in document GB 2185719. Furthermore, given the arrangement of the nacelle surrounding the fans, at the tail of the aircraft, it is difficult to equip this nacelle with movable devices that, in a known manner, either allow the output section to be modified or allow the air exiting the fans to be pushed back. Indeed, in the vicinity of this zone there is no structure that allows the forces generated on the nacelle to be absorbed.

The object of the present invention is to provide a solution that is adapted to the type of aircraft and propulsive unit architecture as previously described, so that the fan operates optimally in the various flight conditions. A second object of the invention is to be able to easily reverse the thrust of the turbine engine in such an architecture.

DISCLOSURE OF THE INVENTION

To this end, the invention relates to an aircraft comprising a fuselage and being propelled by a turbine engine with two coaxial fans, respectively upstream and downstream, driven by two contra-rotating rotors of a power turbine, the two fans and the turbine being integrated in a nacelle downstream of the fuselage, in the extension thereof, and in which an air flow circulates, at least one of the fans, and in particular the downstream fan, comprising variable-pitch vanes, and wherein at least one ring of variable-pitch vanes forming a stator is placed upstream of the upstream fan, the variable-pitch stator vanes and the variable-pitch vanes of the downstream fan being mutually configured to orient the air flow in a first mode where the air circulates in the nacelle in the upstream to downstream direction and in a second mode where the air is pushed back upstream through the nacelle.

The terms upstream and downstream refer to the flow of gases passing through the turbine engine.

Advantageously, the invention is particularly applicable to the case where the two fans operate at a relatively low speed and with a low compression ratio, which generates risks of surges, separation or, more generally, aerodynamic phenomena that are difficult to control. As previously mentioned, such fans generally have an external diameter that is substantially identical to the greatest diameter of the fuselage of the aircraft.

With the rotation speeds of the fans being connected to those of the turbine, if the rotation speed of one of the fans can be adapted to the flight conditions, that of the other fan cannot be modified independently to adapt to the variations in the operating conditions of this fan.

In particular, the variable-pitch of the vanes of the downstream fan allows the operating point of this downstream fan to be adapted to the flow exiting the upstream fan when the rotation speed of the fans changes. Furthermore, in this case it would be difficult to modify the pitch of the vanes of the upstream fan due to space restrictions.

Furthermore, this solution is less complex and does not affect the weight of the turbine engine, as opposed to a turbine engine with doors that would be mounted downstream of the pipe in order to produce a reverse function. In particular, combining the pitch of the stator vanes and the vanes of the downstream fan allows the flow to be oriented, which improves the efficiency of the turbine engine.

Advantageously, a mechanism for rotating a pitch rod for the vanes of the downstream fan is installed in a central body located downstream of the power turbine and surrounded by a primary flow passing through the turbine.

Preferably, the power turbine is located substantially between the two fans.

Advantageously, at least one ring of vanes forming a stator is placed upstream of the upstream fan, the vanes of the ring preferably being variable-pitch vanes. This solution particularly improves the adaptation of the upstream fan to the various operating speeds.

Advantageously, the pitch of the vanes of the downstream fan can be adjusted so that this fan pushes back the air upstream, the nacelle being equipped with means that allow the air to be discharged radially, between the upstream fan and the downstream fan.

This allows the same pitch devices for the vanes of the downstream fan to be used for the reverse thrust as for the adaptation of the operability. Furthermore, the reverse thrust forces are basically applied to the fan and thus are retransmitted through its axis to the structure of the aircraft. The nacelle of the fans therefore is not mechanically stressed; it must simply be configured to allow the air through that is pushed back by the fan.

Preferably, the means for radially discharging air comprise screens that comprise transverse profiles extending radially in the downstream to upstream direction starting from the inside of the nacelle. This allows the air flow exiting the nacelle to be better guided upstream between the two fans.

Advantageously, the screens comprise means forming a valve with regard to the difference between a pressure inside the nacelle and a pressure outside the nacelle. Therefore, a sophisticated control system is not necessary; the screens open automatically during thrust reversal and close when the turbine engine thrusts.

Finally, the invention more specifically relates to an aircraft, in which at least two gas generators supply the power turbine, said gas generators themselves being supplied by distinct air intakes disposed on the periphery of the fuselage of the aircraft.

BRIEF DESCRIPTION OF THE DRAWINGS

The present invention will be better understood, and further details, features and advantages of the present invention will become more clearly apparent, upon reading the following description of a non-limiting example, with reference to the accompanying drawings, in which.

DESCRIPTION OF AN EMBODIMENT

Figure 1:
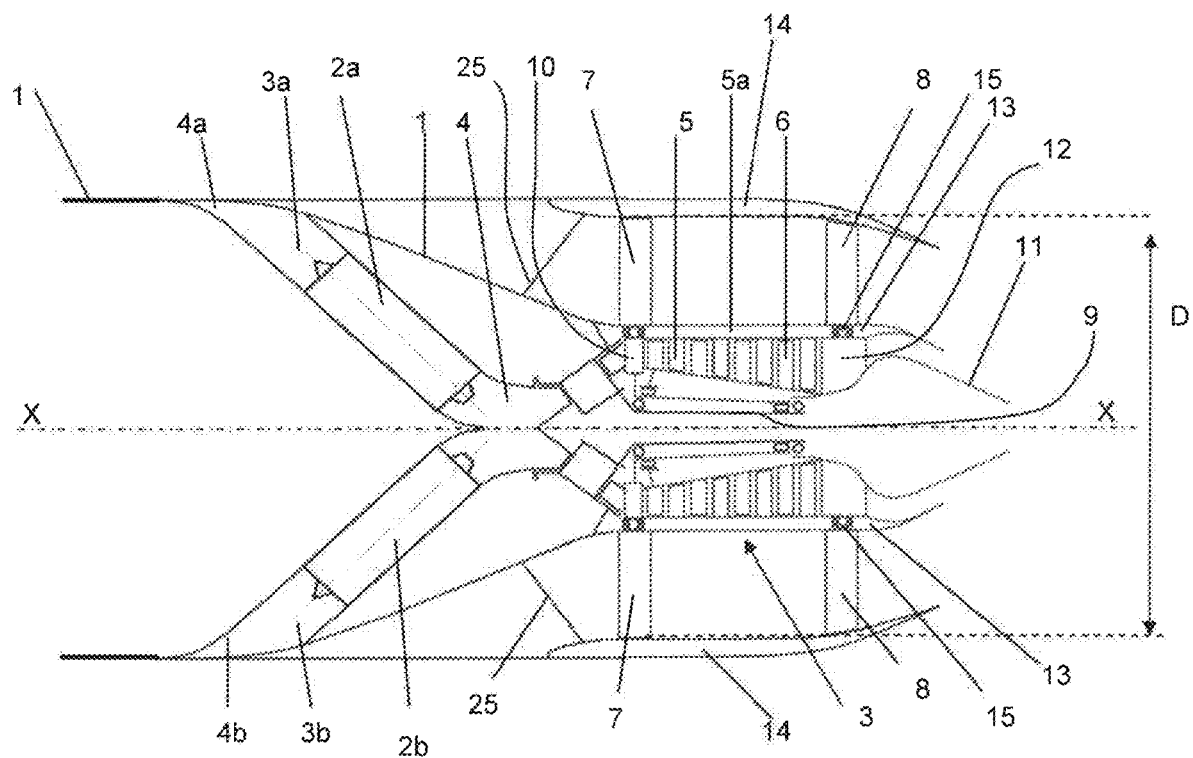
FIG. 1 is a schematic longitudinal section view of the rear part of an aircraft equipped with a turbine engine according to the invention.

The invention is particularly applicable to an aircraft, such as an aeroplane, comprising a turbine engine of the type shown in FIG. 1.

As shown in FIG. 1, the turbine engine is centred on the longitudinal axis XX of the fuselage 1 of the aircraft. This turbine engine comprises, in the upstream to downstream direction, in the direction of flow of the gases, two distinct gas generators 2a, 2b simultaneously supplying a single power turbine 3. The turbine engine is installed at the downstream end of the fuselage 1 of the aircraft.

In a manner known per se, each gas generator 2a, 2b comprises at least one compressor, one combustion chamber and one turbine (not shown in the Fig.).

Each gas generator 2a, 2b is housed inside a primary flow duct 3a, 3b. Distinct air intakes 4a, 4b are provided for these ducts 3a, 3b in order to supply each gas generator 2a, 2b. In the example shown, the air intakes 4a, 4b are connected to the fuselage 1 of the aircraft, upstream of the gas generators 2a, 2b, and their internal wall is directly integrated in the fuselage 1. They thus absorb part of the boundary layer formed around the fuselage 1 of the aircraft. In another configuration, not shown, the lateral air intakes supplying each of the gas generators can be, on the contrary, spaced apart from the fuselage 1 of the aircraft, so as to minimise this phenomenon of boundary layer absorption and to facilitate the operation of the gas generators. It also can be contemplated for more than two gas generators to be used, for example, three, to supply the power turbine 3.

Preferably, the two primary flow ducts 3a, 3b of the gas generators 2a, 2b converge on the longitudinal axis XX and together form an open V in the upstream direction, the angle of opening of which is preferably between 80° and 120°.

The two primary flow ducts 3a, 3b of the gas generators 2a, 2b converge in a central primary duct 4 that supplies the power turbine 3. A mixer (not shown in the Fig.) is preferably positioned at the convergence zone of the two ducts 3a, 3b housing the gas generators 2a, 2b. The purpose of this mixer is to mix the gaseous flows from the two gas generators 2a, 2b in order to generate a single homogenous gaseous flow at the output of the central primary duct 4.

The power turbine 3, which is supplied by this primary flow at the output of the central duct 4, is provided with two contra-rotating turbine rotors 5, 6 for contra-rotating two fans 7, 8. These turbine rotors 5, 6 are coaxial and are centred on the longitudinal axis XX. They rotate about a central casing 9 fixed to the structure of the aircraft.

In this case, a first turbine rotor 5 corresponds to vanes connected to a tubular body 5a separating the primary flow duct, in the power turbine 3, from the secondary flow duct, in which the fans 7, 8 are located. The vanes and the tubular body 5a of the first rotor 5 are connected to the support bearings of the rotor 5 on the internal casing 9 by support arms 10, which pass through the primary duct upstream of the power turbine 3.

In the same example, the second rotor 6 corresponds to vanes connected to a radially internal wall of the primary duct in the turbine 3 and longitudinally interposed between the vanes of the first rotor 5.

Downstream of the power turbine 3, the radially internal part of the second rotor 6 extends by a central body 11. Moreover, it is connected, by support arms 12, to a ring 13 for supporting the vanes of the downstream fan 8. Furthermore, this ring 13 extends the tubular body 5a of the first rotor 5 and comprises a rearwards extension, so as to form, with the central body 11, a primary ejection pipe at the output of the power turbine 3.

In the example shown, a first upstream fan 7 is positioned at the intake of the power turbine 3. It is connected to the first rotor 5 at the arms 10, which upstream support the external cylindrical body 5a. This upstream fan 7 thus rotates at the same speed as the first rotor 5 of the power turbine 3.

In the same example, the second downstream fan 8 is positioned at the output of the power turbine 3. It is connected to the second rotor 6 at the support ring 13 and its supporting arms 12. This downstream fan 8 thus rotates at the same speed as the second rotor 6 of the power turbine 3.

The two fans 7, 8 are ducted by a nacelle 14 that is fixed to the structure of the aircraft. This nacelle 14 is particularly fixed, in this case, to the vertical tail unit of the aircraft, not shown in the Fig. The fans have an external diameter D that substantially corresponds to the greatest external diameter of the fuselage 1 of the aircraft.

With the air entering the fans 7, 8 being partly made up of the boundary layer of the fuselage of the aircraft, the intake speed is low compared to conventional turbine engine fans and the output speed is also lower at an identical compression ratio, which improves the propulsive and acoustic performance of these fans. Furthermore, the significant external diameter D of the fans 7, 8 means that their rotation speed, like that of the rotors 5, 6 of the power turbine 3, will also remain low compared to a conventional turbine engine.

According to a first aspect of the invention, the vanes of the downstream fan 8 are mounted with a device that allows their angular pitch to be varied relative to a meridian plane with regard to the longitudinal axis XX. To this end, with reference to FIG. 1, in this case they are mounted with a system of bearing races 15 on the support ring 13 and each rotate about a radial rod 16 (shown in FIGS. 2 and 3), which passes through a support arm 12 of the ring 13. The vanes of the downstream fan can assume an infinite number of positions.

Figure 2:
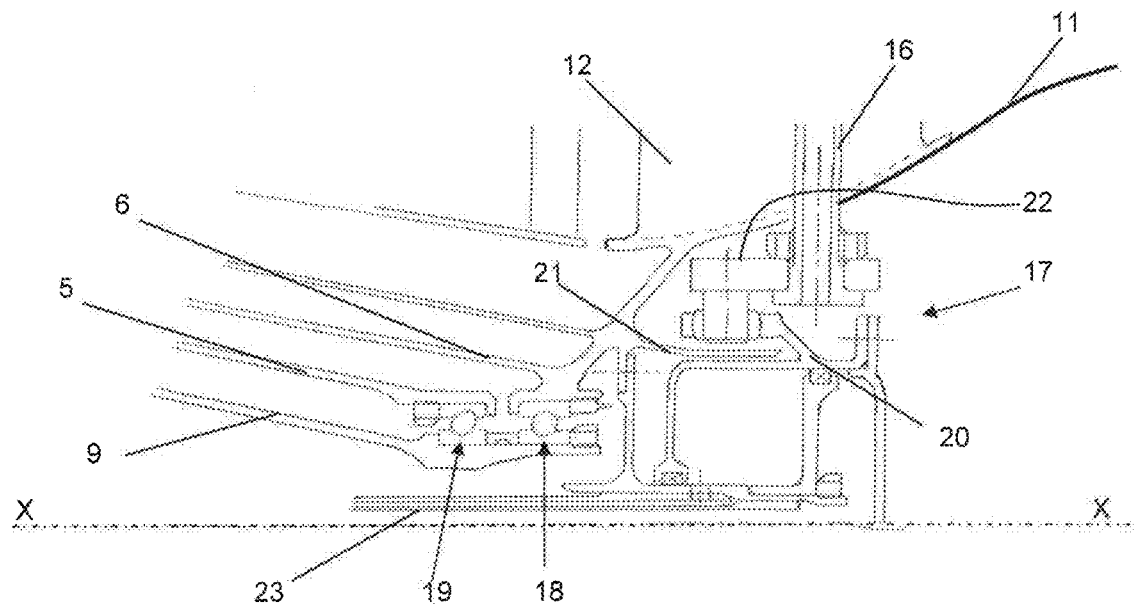
FIG. 2 is a schematic longitudinal section view of the central part of a turbine engine according to the invention, near the axis of symmetry, behind the power turbine.

With reference to FIG. 2, the radial rods 16 of the vanes are rotated by a link rod device 17 near the longitudinal axis XX. FIG. 2 shows the rear of the central casing 9 supporting a first bearing 18 for the second rotor 6 immediately behind a second bearing 19 for the first rotor 5. The device 17 comprises a cylindrical part 20 that is translationally movable along the longitudinal axis XX in a housing 21 of the second rotor 6. For each vane of the downstream fan 8, the movable part 20 is connected to a link rod 22, which itself is rigidly connected to the radial rod 16 of the vane. Through its translation movement, the movable part 20 drives each link rod 22 fixed to the radial rod 16 of a vane and rotates this rod 16 about its axis. The rod 16 then sets the corresponding vane into rotation in the bearing races on the support ring 13. The whole of the device 17 is compactly housed in the central body 11, immediately downstream of the roller bearing 18 of the second rotor 6 of the turbine and under the ring of the support arm 12.

Furthermore, the translation movement of the movable part 20 can be controlled by a system of control rods 23 passing inside the central casing 9. These control rods 23 can be activated by actuators (not shown in the Fig.) placed inside the fuselage 1 of the aircraft, upstream of the power turbine 3.

Figure 3:
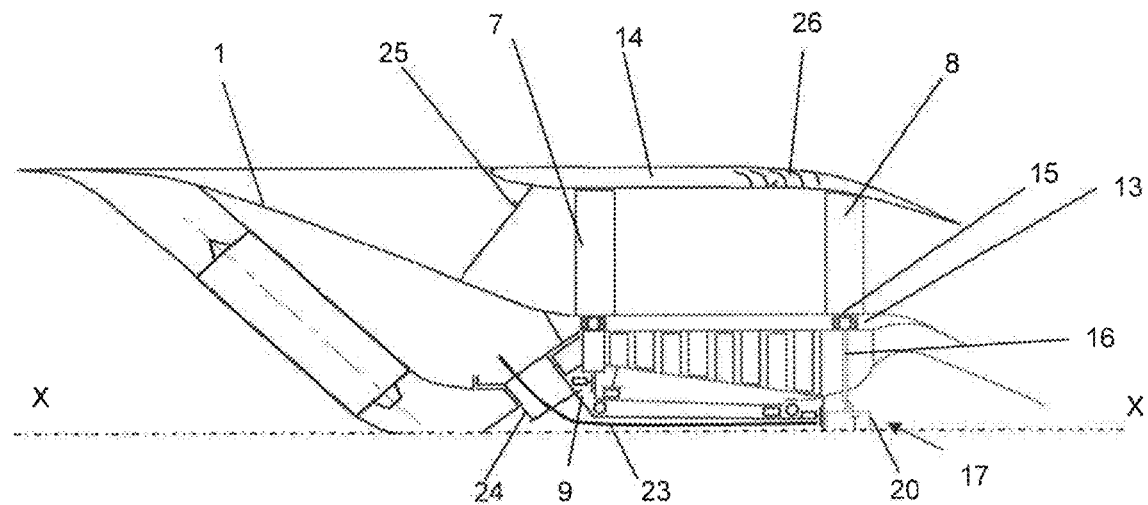
FIG. 3 is a schematic view of a half longitudinal section of the rear part of an aircraft equipped with a turbine engine according to the invention, in a first thrust operating mode.

In a first operating mode, or thrust mode, shown in FIG. 3, the turbine engine is used to propel the aircraft. This device 17 can be used to adjust the pitch of the vanes of the downstream fan 8 as a function of the speed of the turbine engine.

In FIG. 3, the translationally movable part 20 of the device 17 is returned upstream by the control rods 23, in a position that corresponds, for example, to a pitch of the vanes of the downstream fan 8 corresponding to a cruising flight situation. Advantageously, the control rods 23 pass through arms 24 supporting the central casing 9 and are activated by means, not shown, inside the fuselage 1 of the aircraft.

In the example shown in FIGS. 1 and 3, the turbine engine further comprises a stator 25 formed by a ring of vanes connecting the nacelle 14 to the fuselage 1, upstream of the upstream fan 7. Advantageously, means, not shown in the Fig., allow the pitch of the vanes of this stator 25 to be varied.

In this way, the stator 25 allows the operation of the upstream fan 7 to be adapted to various engine speeds by acting on the incident flow. This mitigates the fact that the space restrictions in the vicinity of the upstream fan 7 can make it difficult to install a pitch device for its vanes.

Figure 5A:
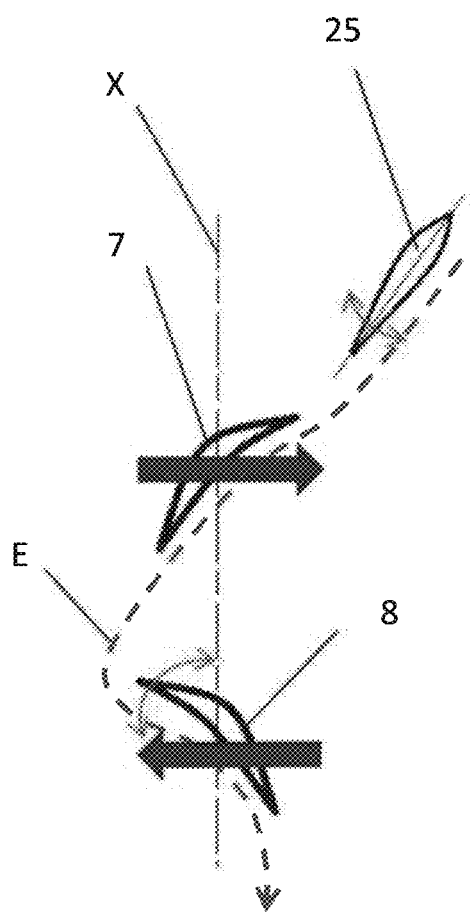
FIGS. 5a and 5b schematically show the first and the second operating mode of the turbine engine, in which the air flow is oriented as a function of the pitch of the stator vanes and of the vanes of the downstream fan.
Figure 5B:
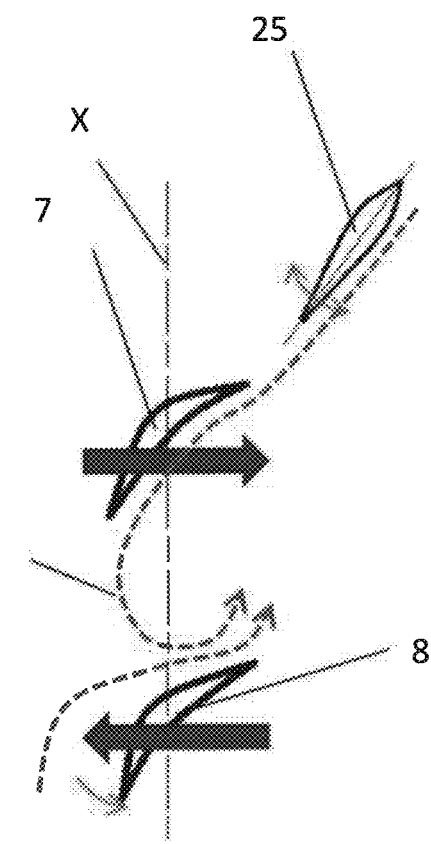

In particular, as can be seen in FIGS. 5a and 5b, the operation of the fan can be adjusted with the variable-pitch stators. FIG. 5a schematically shows a top view of the turbine engine in thrust operating mode. The vane of the upstream and downstream fans 7, 8 and the stator vane 25 are oriented so as to generate a downstream flow E (namely from top to bottom in this Fig.), without disruptions. In this case, the position of the stator vane varies so as to vary the incidence of the flow on the vanes of the upstream fan 7, which is fixed. The vanes of the downstream fan 8 can assume an infinite number of positions between +60° and −30° relative to the axis X as a function of the position of the stator vane 25. In other words, the positions of the stator vanes 25 and those of the downstream fan are jointly modulated in order to best promote the flow of the secondary flow.

In FIG. 5b, the turbine engine is schematically shown in a second reverse thrust operating mode. Within the context of this mode, the upstream fan 7 is still fixed. The vane of the downstream fan 8 is positioned so as to push back the air flow upstream, and particularly through the screen 26. In particular, the stator vane 25 orients the flow of the air flow toward the vane of the upstream fan so that this fan also orients the flow in order to be easily pushed back by the vane of the downstream fan.

Therefore, this solution is less complex and does not affect the weight of the turbine engine, as opposed to a turbine engine with doors that would be mounted downstream of the pipe in order to produce a reverse thrust function. In particular, combining the pitch of the stator vanes and the vanes of the downstream fan allows the flow to be oriented, which improves the efficiency of the turbine engine.

Figure 4:
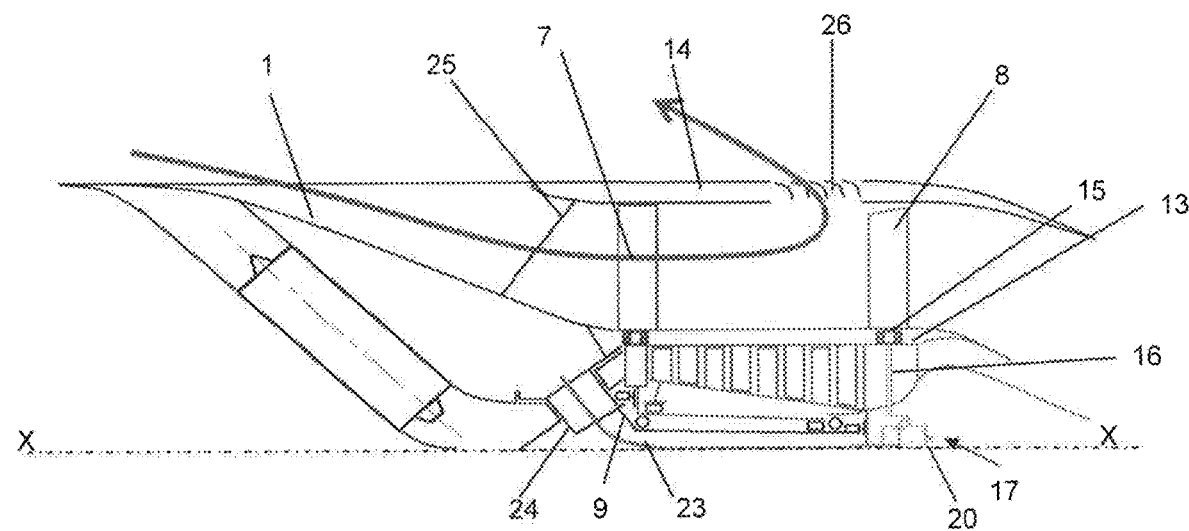
FIG. 4 is a schematic view of a half longitudinal section of the rear part of an aircraft equipped with a turbine engine according to the invention, in a second reverse thrust operating mode.

According to another aspect of the invention, shown in FIG. 4, the longitudinal travel of the movable part 20 of the device 17 in this case is sufficient to rotate the vanes of the downstream fan 8 by a sufficient angle about the axis of their rod 16 so that they push back the flow upstream. FIG. 4 shows a case where the position of the vanes is reversed relative to the incident flow.

In line with this configuration, the nacelle 14 comprises openings provided with screens 26 upstream of the downstream turbine. The air pushed back by the downstream fan 8 thus can be discharged upstream via the screens 26 and can generate a counter-thrust for slowing down the aircraft.

In order to effectively guide the air upstream and to enhance this effect, the transverse parts of the screens in this case comprise, as shown in FIG. 4, plates that extend radially in the downstream to upstream direction from the inside of the nacelle 14.

With reference to FIG. 3, the openings of the screens 26 are plugged when the turbine engine operates in propulsion mode. The means controlling the opening and the closing of the screens 26, which are not shown in the Fig., can be controlled or can be automatic. Control means can comprise, for example, plates that slide along the nacelle 14, depending on the selected operating mode. Automatic means can comprise systems of the valve type, with an elastic return for plugging the openings of the screens 26 if the pressure difference between the inside and the outside of the nacelle 14 is not strong enough.

In this way, a turbine engine equipped with a variable-pitch system for the vanes of the downstream fan 8, as previously described, can use this system both to adapt the operation of the fans during propulsion phases and to reverse the thrust.

The invention claimed is:

1. An aircraft comprising a fuselage and being propelled by a turbine engine with an upstream fan and a downstream fan coaxial to a longitudinal axis, said upstream and downstream fans being driven by two contra-rotating rotors of a power turbine, the contra-rotating rotors being coaxial and rotating around a central casing fixed to a fixed structure of the aircraft, the upstream fan, downstream fan and the power turbine being integrated in a nacelle downstream of the fuselage, in an extension thereof, and in which an air flow circulates, wherein the power turbine is positioned radially inward of the upstream and downstream fans, at least one arm positioned upstream of the power turbine configured to support the central casing inside the extension of the fuselage, wherein the downstream fan comprises variable-pitch vanes which are intended to vary an angular pitch around a radial axis perpendicular to said longitudinal axis via at least one control rod, said at least one control rod positioned within the central casing and extends through the at least one arm, and wherein a plurality of variable-pitch-stator vanes are placed upstream of the upstream fan, wherein said aircraft comprises a central body which extends the central casing, a ring supporting the downstream fan, the vanes of the downstream fan each comprises a pitch rod which extends radially between the central body and the ring, the plurality of variable-pitch stator vanes and the variable-pitch vanes of the downstream fan being mutually configured to orient the air flow,
  in a first mode where the air flow circulates in the nacelle in the upstream to downstream direction and
  in a second mode where the air flow is pushed back upstream through the nacelle.

2. The aircraft according to claim 1, wherein a variable-pitch mechanism controlled by the at least one control rod and driving in rotation the pitch rods for the vanes of the downstream fan is installed in the central body, the variable-pitch mechanism located downstream of the power turbine and surrounded by a primary flow passing through the power turbine.

3. The aircraft according to claim 2, wherein a link rod positioned near the longitudinal axis connects the pitch rod to the downstream rotor.

4. The aircraft according to claim 2, wherein the at least one control rod is positioned inside the central casing, the at least one control rod is actuated by at least an actuator.

5. The aircraft according to claim 1, wherein the power turbine is located between the two coaxial upstream and downstream fans.

6. The aircraft according to claim 1, wherein a pitch of the variable-pitch vanes of the downstream fan can be adjusted so that the downstream fan pushes the air back upstream, the nacelle being equipped with radially discharging means that allow the air to be discharged radially, between the upstream fan and the downstream fan.

7. The aircraft according to claim 6, wherein the radially discharging means comprise screens, the screens comprise a transverse profile that extends radially in the downstream to upstream direction starting from inside of the nacelle.

8. The aircraft according to claim 7, further comprising a valve configured to open and close the screens based on the difference between a pressure inside the nacelle and a pressure outside the nacelle.

9. The aircraft according to claim 6, wherein the discharging means comprising screens are fixed inside the nacelle.

10. The aircraft according to claim 6, wherein the discharging means are radially aligned with the power turbine.

11. The aircraft according to claim 1, wherein at least two gas generators supply gases to the power turbine, said two generators each being supplied by distinct air intakes disposed on the periphery of the fuselage of the aircraft.

12. The aircraft according to claim 1, wherein said variable-pitch stator vanes connecting the nacelle to the fuselage.

13. The aircraft according to claim 1, wherein in the second mode the air enters the nacelle through the upstream fan and is pushed back upstream to be ejected through the nacelle.

14. The aircraft according to claim 1, wherein the nacelle has an external surface aligned with the fuselage.

15. An aircraft comprising a fuselage and being propelled by a turbine engine with an upstream fan and a downstream fan coaxial to a longitudinal axis, said upstream and downstream fans being driven by two contra-rotating rotors of a power turbine, the power turbine comprising turbine vanes extending around a central casing, the upstream fan, downstream fan and the power turbine being integrated in a nacelle downstream of the fuselage, in an extension thereof, and in which an air flow circulates, wherein the power turbine is positioned radially inward of the upstream and downstream fans, at least one first arm positioned upstream of the power turbine configured to support the central casing inside the fuselage, wherein the upstream fan is fixed and the downstream fan comprises variable-pitch vanes which are intended to vary an angular pitch around a radial axis perpendicular to said longitudinal axis via at least one control rod, said at least one control rod positioned within the central casing and extends through the at least one arm, and wherein a plurality of variable-pitch stator vanes are placed upstream of the upstream fan, the plurality of variable-pitch stator vanes and the variable-pitch vanes of the downstream fan being mutually configured to orient the air flow in a first mode where the air circulates in the nacelle in the upstream to downstream direction without disruption, and
  in a second mode where the air is oriented by the stator vanes towards the upstream fan which is arranged to orient the air toward the downstream fan, the downstream fan pushing back the air upstream through the nacelle,
  the nacelle having an external surface aligned with the fuselage according to the longitudinal axis and equipped radially with discharging means that allow the air to be discharged radially, said discharging means being radially and axially aligned with the power turbine and arranged axially between the upstream fan and the downstream fan.

16. The aircraft according to claim 15, wherein said aircraft comprises a central body, a ring supporting the downstream fan, a second supporting arm extending radially linking the central body and the ring, the vanes of the downstream fan each comprises a pitch rod which extends inside a respective second supporting arm.

17. The aircraft according to claim 16, wherein the central body and the ring forms a primary ejection pipe at an outlet of the power turbine.

18. The aircraft according to claim 1, wherein a bearing is mounted around each pitch rod inside the ring.

19. The aircraft according to claim 1, wherein each of said pitch rods comprises an axis defined in a plane perpendicular to the longitudinal axis and placed downstream of the central casing and the power turbine.

20. The aircraft according to claim 1, further comprising a variable-pitch mechanism configured to rotate the pitch rods of the variable-pitch vanes of the downstream fan, the variable-pitch mechanism comprising link rods connecting said pitch rods and a movable body, the movable body configured to move along the longitudinal axis.

21. The aircraft according to claim 16, wherein a bearing is mounted around each pitch rod inside the ring.

22. The aircraft according to claim 1, wherein the central casing comprises a rear to support a first bearing for the downstream fan immediately behind a second bearing for the upstream fan.

23. The aircraft according to claim 22 wherein, a variable-pitch mechanism for varying the pitch of the vanes of the downstream fan is compactly housed in the central body, immediately downstream of the first bearing.

24. An aircraft comprising a fuselage and being propelled by a turbine engine with an upstream fan and a downstream fan coaxial to a longitudinal axis, said upstream and downstream fans being driven by two contra-rotating rotors of a power turbine, the contra-rotating rotors being coaxial and rotating around a central casing fixed to a fixed structure of the aircraft, the upstream fan, downstream fan and the power turbine being integrated in a nacelle downstream of the fuselage, in an extension thereof, and in which an air flow circulates, wherein the power turbine is positioned radially inward of the upstream and downstream fans, at least one arm positioned upstream of the power turbine configured to support the central casing inside the fuselage, wherein the downstream fan comprises variable-pitch vanes which are intended to vary an angular pitch around a radial axis perpendicular to said longitudinal axis via at least one control rod, said at least one control rod positioned within the central casing and extends through the at least one arm, wherein a plurality of variable-pitch stator vanes are being placed upstream of the upstream fan, wherein said aircraft comprises a central body which extends the central casing, wherein the vanes of the downstream fan each comprises a pitch rod which extends radially from the central casing, wherein each pitch rod comprises an axis defined in a plane perpendicular to the longitudinal axis and placed downstream of the central casing and the power turbine, the plurality of variable-pitch stator vanes and the variable-pitch vanes of the downstream fan being mutually configured to orient the air flow, in a first mode where the air flow circulates in the nacelle in the upstream to downstream direction and in a second mode where the air flow is pushed back upstream through the nacelle.

\* \* \* \* \*